United States Patent Office 3,042,681
Patented July 3, 1962

3,042,681
INSULANT COATING COMPRISING POLYVINYL ALCOHOL, ASBESTOS, CEMENT AND AGGREGATE
Robert C. Sefton, Pittsburgh, Pa., assignor to Steel City Industries, Inc., a corporation of Pennsylvania
No Drawing. Filed May 25, 1959, Ser. No. 815,248
6 Claims. (Cl. 260—296)

This invention relates to insulant coatings, and, particularly, to a light weight, fireproof insulant coating for metals, masonry and other building components.

There has long been a need for a light weight fireproof insulant coating adapted to be troweled, sprayed or otherwise applied to building components such as steel structural members, masonry, metal panel structures, etc. Many structural members must be covered with a fireproof coating of concrete or similar materials. Such coatings are difficult to apply, heavy in weight and not entirely satisfactory.

I have discovered a fireproof insulant composition which may be troweled or sprayed onto any surface. The broad general composition of my invention is as follows:

| | Percent |
|---|---|
| Polyvinyl alcohol | 0.5 to 2.5 |
| Asbestos | 7.5 to 16 |
| Gypsum | 30 to 50 |
| Portland cement | 5.5 to 13.5 |
| Aggregate | 25 to 40 |

Water to make a mixture of suitable viscosity.

Preferably, however, I form a sprayable composition having the following proportions:

| | | |
|---|---|---|
| Polyvinyl alcohol | ounces | 5 |
| Asbestos | pounds | 2½ |
| Gypsum | do | 9 |
| Portland cement | do | 2 |
| #2 vermiculite | do | 8 |
| Water | gallons | 6 |

If it is desired to trowel this latter mixture the amount of water should be reduced to make a mixture of suitable viscosity.

Preferably, the polyvinyl alcohol used is in the form of a water soluble powder such as Du Pont "Elvanol." The asbestos is, preferably, very finely divided as for example #152 asbestos of Keasby and Mattison. The Portland cement may be any standard grade of waterproof cement. Preferably, the gypsum is an alpha gypsum such as United States Gypsum Co. "Mastical."

The aggregate may be vermiculite, perlite, granulated or expanded slag or any other light weight aggregate. Cork, sawdust and the like may be used as the aggregate where the fireproof requirement is not stringent.

The material of the foregoing compositions may be applied as thick as necessary in one operation, it does not shrink on drying, it does not brush off when dry and has excellent bonding characteristics to practically all materials without the need of a pre-applied bonding agent.

I have sprayed coatings made according to the preferred composition up to two inches in thickness in one operation on the galvanized steel interiors of a quonset hut. These coatings were fireproof, light weight and tightly bonded to the galvanized surface.

I have sprayed the same composition up to four inches thick on concrete block walls in a single operation without any cracking or shrinking on drying and without any noticeable surface defects.

In the foregoing specification, I have set out certain preferred embodiments and practices of my invention, however, it will be understood that this invention may be otherwise embodied within the scope of the following claims.

I claim:

1. An insulant coating comprising polyvinyl alcohol about 0.5% to 2.5%, asbestos about 7.5% to 16%, gypsum about 30% to 50%, Portland cement about 5.5% to 13.5% and light weight aggregate about 25% to 40%.

2. A fluid insulant coating composition adapted to be applied to surfaces of building components consisting of a mixture of solids in sufficient water to make a flowable composition, said solids mixture comprising by weight about 0.5% to 2.5% polyvinyl alcohol, about 7.5% to 16% asbestos, about 30% to 50% gypsum, about 5.5% to 13.5% Portland cement and about 25% to 40% light weight aggregate.

3. A composition as claimed in claim 1 in which the aggregate is a material selected from the group consisting of vermiculite, perlite, slag beads, and granulated slag.

4. A composition as claimed in claim 2 in which the aggregate is a material selected from the group consisting of vermiculite, perlite, slag beads, and granulated slag.

5. A flowable insulant coating comprising polyvinyl alcohol about 5 ounces, asbestos about 2½ pounds, gypsum about 9 pounds, Portland cement about 2 pounds, vermiculite about 8 pounds and water about 6 gallons.

6. A flowable insulant coating comprising polyvinyl alcohol about 5 ounces, asbestos about 2½ pounds, gypsum about 9 pounds, Portland cement about 2 pounds, perlite about 8 pounds and water about 6 gallons.

References Cited in the file of this patent

UNITED STATES PATENTS

| 2,311,233 | Jaenicke et al. | Feb. 16, 1943 |
| 2,491,487 | Faulwetter | Dec. 20, 1949 |
| 2,576,955 | Ludwig | Dec. 4, 1951 |
| 2,581,295 | Redfarn | Jan. 1, 1952 |
| 2,662,064 | Mead | Dec. 8, 1953 |